UNITED STATES PATENT OFFICE.

JÉRÔME N. J. DUBREUIL, OF BREST, FRANCE.

IMPROVEMENT IN MANUFACTURE OF IODINE AND BROMINE.

Specification forming part of Letters Patent No. 217,076, dated July 1, 1879; application filed February 12, 1879.

*To all whom it may concern:*

Be it known that I, JEROME N. J. DUBREUIL, of Brest, in the Republic of France, have invented certain Improvements in the Treatment of Green Sea-Weed, of which the following is a specification.

The object of my invention is to subject green sea-weed to such treatment as to extract from said weeds all the useful salts they contain, and more particularly the iodine and bromine, and this object I attain in the manner which I will now proceed to describe.

Fresh sea-weed, while in its green state, as when first gathered by the fishers, is submitted to the triturating action of disintegrating-machines, such as those employed for disintegrating the fibers of wood and other fibrous material. On its exit from these disintegrators the sea-weed is in the form of a thick pulp, which falls into receptacles arranged under the machines. Although the pulp is completely disintegrated after its passage through these machines, the organic matter held in suspension is not in a condition to be completely separated, owing to the fact that the plant reabsorbs a considerable part of its juices. I therefore introduce into the disintegrated sea-weed in the receptacles a solution of lime, in order to be able to completely separate the juices, and also to aid in their clarification.

The minimum quantity of lime to be employed, and which is prepared by slaking caustic lime, is about four per cent. A greater proportion may be used if the pulped sea-weed is very thick.

In order to cause a thorough intermixture of the lime and the sea-weed, I provide each receptacle with stirring or mixing devices, operated by steam.

At the end of about twelve hours the mixture is withdrawn from the vats or receptacles and submitted to the action of hydraulic or other presses or some straining apparatus, in order to extract all the juices from the material.

A quantity of a thousand kilograms of sea-weed thus disintegrated, submitted to the action of lime, and pressed will yield about eight hundred liters of juices and two hundred kilograms of moist residuum.

The juices resulting from this process, after they have been allowed to settle, are decanted, and are then treated by any of the well-known chemicals necessary to obtain a precipitation of the iodine.

The residuum deposited by the decanting process is washed, and the waters therefrom are collected, to be afterward employed for treating fresh quantities of lime.

The proportion of iodine obtained varies according to the character of weed under treatment. The richest sea-weed is that which is obtained from the bottom of the sea, while the poorer kinds are those thrown up on the shore by the waves.

The pulped material from which the useful salts have been thus extracted, and which contains a considerable quantity of lime, makes a good manure, and may be put up in the form of cakes or block, or in any other convenient way.

The advantages of this process are, that no calcination is required, and consequently there is no evaporation or waste of the iodine, and at the same time no destruction of the organic matter, which is so useful for manure; and, owing to the great state of division of the material treated, all the iodine contained in it is collected.

I claim as my invention—

The within-described method of treating green sea-weeds for the extraction of the useful salts they contain—that is to say, first disintegrating the said weeds, then mixing lime with the pulped mass and extracting the liquid from the mixture by the action of strainers or presses, and, finally, precipitating the salts in this solution, all substantially as described.

In testimony whereof I have signed my name to this specification in the presence of two subscribing witnesses.

JEROME NARCISSE JOUVEAU DUBREUIL.

Witnesses:
JOSEPH DELAGE,
ROBT. M. HOOPER,
DAVID T. J. FULLER.